US011095864B2

(12) United States Patent
Thebault et al.

(10) Patent No.: US 11,095,864 B2
(45) Date of Patent: Aug. 17, 2021

(54) METHOD AND DEVICE FOR COLOR GAMUT MAPPING

(71) Applicant: INTERDIGITAL VC HOLDINGS, INC, Wilmington, DE (US)

(72) Inventors: Cedric Thebault, Saint Aubin d'Aubigne (FR); Jurgen Stauder, Montreuil/Ille (FR); Angelo Mazzante, Cesson-Sevigne (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 0 days.

(21) Appl. No.: 16/610,503

(22) PCT Filed: Apr. 26, 2018

(86) PCT No.: PCT/EP2018/060702
§ 371 (c)(1),
(2) Date: Nov. 2, 2019

(87) PCT Pub. No.: WO2018/202531
PCT Pub. Date: Nov. 8, 2018

(65) Prior Publication Data
US 2020/0404234 A1 Dec. 24, 2020

(30) Foreign Application Priority Data
May 2, 2017 (EP) ..................... 17305495

(51) Int. Cl.
*H04N 9/68* (2006.01)
*H04N 9/67* (2006.01)
(Continued)

(52) U.S. Cl.
CPC ................. *H04N 9/67* (2013.01); *H04N 9/68* (2013.01); *H04N 19/186* (2014.11); *H04N 19/46* (2014.11)

(58) Field of Classification Search
CPC .. H04N 9/68; H04N 9/67; H04N 9/64; H04N 9/69; H04N 9/77; H04N 19/46;
(Continued)

(56) References Cited

U.S. PATENT DOCUMENTS 7,583,411 B2    9/2009  Kang et al.
7,809,187 B2    10/2010 Shimbaru
(Continued)

FOREIGN PATENT DOCUMENTS

CN    1708097 A    12/2005
CN    101312487 A  11/2008
(Continued)

OTHER PUBLICATIONS

Francois et al., "A Single-Layer HDR Video Coding Framework with SDR Compatibility"; IBC 2016 Conference, Amsterdam, Netherlands, Sep. 8, 2016, 10 pages.
(Continued)

*Primary Examiner* — Sherrie Hsia
(74) *Attorney, Agent, or Firm* — Invention Mine LLC

(57) ABSTRACT

The present principles relate to a method and device for gamut mapping from a first color gamut towards a second color gamut. The method comprises, in a plane of constant hue, mapping the chroma of the color from the first color gamut towards the second color gamut at constant lightness. The chroma mapping further comprises obtaining a target color on the second color gamut boundary wherein the lightness of the target color is greater than or equal to the lightness of a color of maximum chroma of the first color gamut and wherein the lightness of the target color is lower than the lightness of a color of maximum chroma of the second color gamut. In case where the lightness of the color is greater than the lightness of the target color, the chroma mapping comprises mapping at constant lightness the
(Continued)

chroma of a color on the first color gamut boundary by a decreasing function of chroma applied to lightness, wherein the respective outputs of the decreasing function applied to the lightness of the target color and to the lightness of the white are the chroma of the target color and the chroma of the white.

20 Claims, 9 Drawing Sheets

(51) Int. Cl.
  *H04N 19/186* (2014.01)
  *H04N 19/46* (2014.01)

(58) Field of Classification Search
  CPC ........ H04N 19/186; H04N 5/57; G06T 5/009; G06T 2207/20208
  USPC ........ 348/645–647, 649, 651–654, 659–661, 348/687–689, 703, 708; 382/162, 167; 345/589–591
  See application file for complete search history.

(56) References Cited

U.S. PATENT DOCUMENTS

| 8,934,138 B2 | 1/2015 | Iwafuchi et al. |
| 2005/0248784 A1 | 11/2005 | Henley et al. |
| 2007/0097389 A1 | 5/2007 | Morovic |
| 2013/0050245 A1 | 2/2013 | Longhurst et al. |
| 2016/0381254 A1* | 12/2016 | Poree ........................ H04N 9/67 382/167 |
| 2020/0193573 A1* | 6/2020 | Thebault .................. H04N 9/68 |

FOREIGN PATENT DOCUMENTS

| EP | 2375719 A1 | 10/2011 |
| EP | 3096510 A1 | 11/2016 |
| EP | 3110123 A1 | 12/2016 |
| JP | 2016066195 A | 4/2016 |

OTHER PUBLICATIONS

Anonymous, "Conformance specification for ITU-T H.265 high efficiency video coding", International Telecommunication Union, ITU-T Telecommunication Standardization Sector of ITU, Series H: Audiovisual and Multimedia Systems, Infrastructure of audiovisual services—Coding of moving video, Recommendation ITU-T H.265.1, Oct. 2014, 42 pages.

Diaz et al., "Integrating HEVC Video Compression with a High Dynamic Range Video Pipeline", SMPTE Motion Imaging Journal, vol. 125, No. 1, Jan. 2016, pp. 14-21.

* cited by examiner

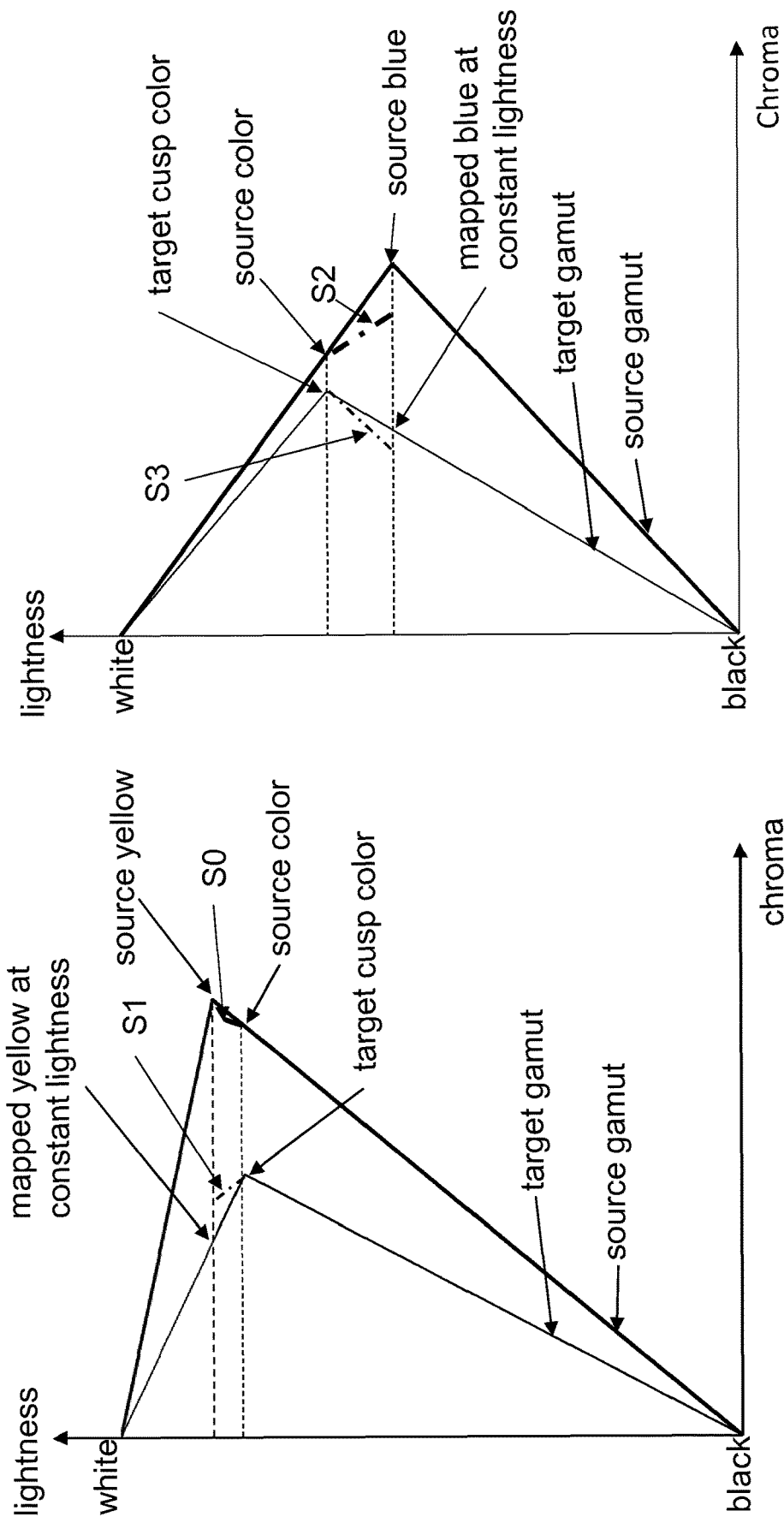
Fig. 1b : prior art
Fig. 1a : prior art

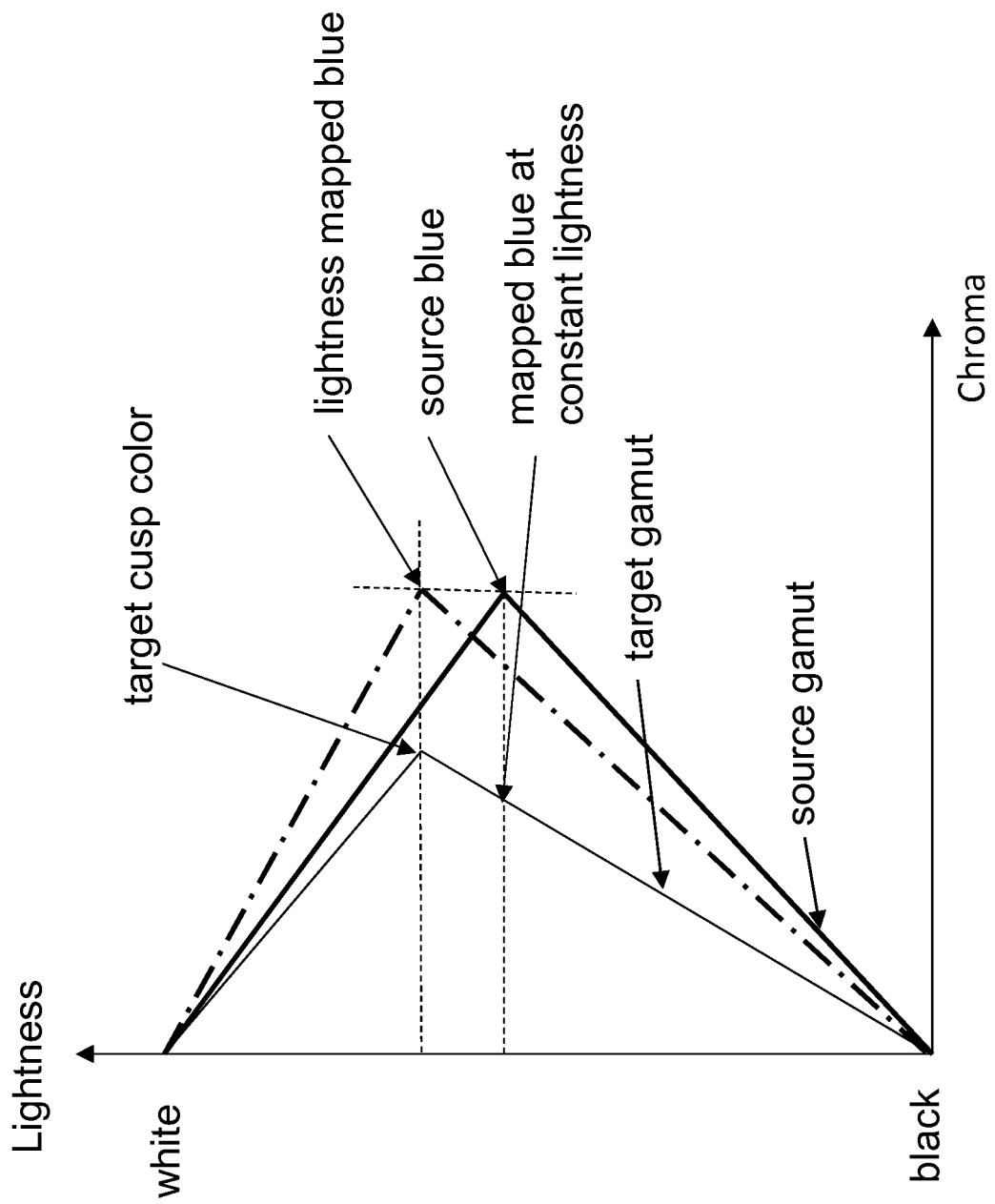
Fig. 1c : prior art

METHOD AND DEVICE FOR COLOR GAMUT MAPPING

This application claims the benefit, under 35 U.S.C. § 365 of International Application PCT/EP2018/060702, filed Apr. 26, 2018, which was published in accordance with PCT Article 21(2) on Nov. 8, 2018, in English, and which claims the benefit of European Patent Application No. 17305495.8, filed May 2, 2017.

1. FIELD

The present principles generally relate to image/video coding/decoding. Particularly, but not exclusively, the technical field of the present principles are related to color gamut mapping of an image whose pixel values belong to a high-dynamic range and inverse color gamut mapping of an image whose pixel values belong to a low-dynamic range.

2. BACKGROUND

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

In the following, an image contains one or several arrays of samples (pixel values) in a specific image/video format which specifies all information relative to the pixel values of an image (or a video) and all information which may be used by a display and/or any other device to visualize and/or decode an image (or video) for example. An image comprises at least one component, in the shape of a first array of samples, usually a luma (or luminance) component, and, possibly, at least one other component, in the shape of at least one other array of samples, usually a chroma component. Or, equivalently, the same information may also be represented by a set of arrays of color samples, such as the traditional tri-chromatic RGB representation.

A pixel value is represented by a vector of C values, where C is the number of components. Each value of the vector is represented with a number of bits which defines a maximal dynamic range of the pixel values.

Low-Dynamic-Range images (LDR images) are images whose luminance values are represented with a limited number of bits (most often 8 or 10). This limited representation does not allow correct rendering of small signal variations, in particular in dark and bright luminance ranges. In high-dynamic range images (HDR images), the signal representation is extended in order to maintain a high accuracy of the signal over its entire range. In HDR images, pixel values representing luminance levels are usually represented in floating-point format (either 32-bit or 16-bit for each component, namely float or half-float), the most popular format being open EXR half-float format (16-bit per RGB component, i.e. 48 bits per pixel) or in integers with a long representation, typically at least 16 bits.

The arrival of the High Efficiency Video Coding (HEVC) standard (ITU-T H.265 Telecommunication standardization sector of ITU (October 2014), series H: audiovisual and multimedia systems, infrastructure of audiovisual services—coding of moving video, High efficiency video coding, Recommendation ITU-T H.265) enables the deployment of new video services with enhanced viewing experience, such as Ultra HD broadcast services. In addition to an increased spatial resolution, Ultra HD can bring a wider color gamut (WCG) and a higher dynamic range (HDR) than the Standard dynamic range (SDR) HD-TV currently deployed. Different solutions for the representation and coding of HDR/WCG video have been proposed (SMPTE 2014, "High Dynamic Range Electro-Optical Transfer Function of Mastering Reference Displays, or SMPTE ST 2084, 2014, or Diaz, R., Blinstein, S. and Qu, S. "Integrating HEVC Video Compression with a High Dynamic Range Video Pipeline", SMPTE Motion Imaging Journal, Vol. 125, Issue 1. February, 2016, pp 14-21).

SDR backward compatibility with decoding and rendering devices is an important feature in some video distribution systems, such as broadcasting or multicasting systems.

Dual-layer coding is one solution to support this feature. However, due to its multi-layer design, this solution is not adapted to all distribution workflows.

An alternative is a single Layer HDR distribution solution as defined by the ETSI recommendation ETSI TS 103 433. The reader may also refer to the IBC 2016 article ("A single-Layer HDR video coding framework with SDR compatibility", E. Francois and L. Van de Kerkhof, IBC 2016) for more details. This single layer distribution solution is SDR compatible and leverages SDR distribution networks and services already in place. It enables both high quality HDR rendering on HDR-enabled CE (Consumer Electronics) devices, while also offering high quality SDR rendering on SDR CE devices.

This single layer distribution solution is based on a single layer coding/decoding process and is codec independent (a 10 bits codec is recommended).

This single layer distribution solution uses side metadata (of a few bytes per video frame or scene) that can be used in a post-processing stage to reconstruct the HDR signal from a decoded SDR signal.

When the decoded SDR signal and the reconstructed HDR signal do not have the same color space, an inverse gamut mapping (being the dual function of a gamut mapping in a pre-processing stage at the HDR encoding) may be used in such post-processing stage. In practice, color gamuts may be defined by standards such as NTSC, ITU-R BT rec.709 ("rec. 709"), ITU-R BT rec. 2020 ("rec. 2020"), Adobe RGB, DCI-P3, or any other present or future standards for color reproduction or any other constraint(s) on color variety. In case of single layer distribution of HDR/WCG, "color gamut mapping" is the process of mapping or redistributing colors of the wider color gamut ("source colors") to colors of a narrower color gamut ("target colors"). When trying to define a method mapping source colors inside a source color gamut (having its own source boundary) into target colors such they are located inside a target color gamut (having its own target boundary), in order to take advantage of the whole range of colors in the target color gamut, it is known to define the color gamut mapping according to different conditions among which a boundary mapping condition: any source boundary color should be mapped into a target boundary color. However, such color gamut mapping is problematic because it results in faded colors as illustrated on FIG. 1a. FIG. 1a and FIG. 1b illustrate a color gamut mapping in a hue leaf in accordance with prior art. A hue leaf is a plane section of the color gamut at a constant hue (yellow on FIG. 1a, blue on FIG. 1b). The boundary color gamut mapping is performed by scaling chroma value at a constant lightness value. FIG. 1a illustrates the case where the source cusp color (source yellow) is brighter than the target cusp color meaning that, in this hue leaf, the lightness of the source color with maximum chroma (source yellow) is greater (brighter) than the lightness of the target color (target cusp color) with maximum chroma. Those skilled in art will appreciate that if the source cusp color, source yellow on FIG. 1a, corresponds to yellow primary of the source gamut, the target cusp color may not necessarily correspond to the yellow primary of the target gamut, as the yellow primary of the source gamut and the yellow primary of the target gamut may have different hues. As shown on FIG. 1a, without lightness mapping, the source yellow is mapped to a faded yellow (mapped yellow at constant lightness) being a mixture of yellow and white. Besides, some colors on the source boundary with increasing values of chroma and lightness (on segment S0) are thus mapped to color on the target boundary with decreasing value of chroma and increasing value of lightness (on segment 51). This is particularly visually embarrassing. FIG. 1b illustrates the case where the source cusp color, source blue on FIG. 1b, is darker than the corresponding target cusp color meaning that, in this hue leaf, the lightness of the source color with maximum chroma (source blue) is lower (darker) than the lightness of the target color (target cusp color) with maximum chroma. As shown on FIG. 1b, without lightness mapping, the source blue (corresponding to the color with maximum chroma) is mapped to a blue (mapped blue at constant lightness) of same brightness but not corresponding to the color with maximum chroma in the target gamut. The source cusp color (source blue) is not mapped to the most saturated color (target cusp color) of this hue leaf in the target gamut as shown on FIG. 1b. Thus, without lightness mapping, the source blue is mapped to a blue (mapped blue at constant lightness) of same brightness but desaturated. However, another color (source color) in the source color gamut, representing a faded blue compared to the source blue, is mapped to the most saturated color (target cusp color) of this hue leaf in the target gamut as shown on FIG. 1b, so that the mapped color (target cusp color) in the target image will be perceived too saturated relatively to the mapped blue at constant lightness. This is an inversion of saturation. Indeed, the source color segment (S2) and the mapped color segment (S3) have inversed saturation slopes with known methods of chroma mapping. The same issue arises for yellow hue leaf. Similarly, in the target image the mapped yellow at constant lightness will be perceived not enough saturated relatively to the mapped color (target cusp color). A possible solution to avoid saturation inversion, illustrated on FIG. 1c, is to apply a preliminary lightness mapping to get the lightness of the source cusp color aligned with the lightness of the target cusp color. However, such solution would increase the lightness of the mapped color for the source blue. This alters the contrast of the images after color gamut mapping, and thus the artistic intent: in the example, blues get lighter while yellows get darker.

An invertible color gamut mapping method that avoids or at least reduces saturation inversion while better preserving the contrast of the image is therefore desirable for enhancing the rendering of HDR signal.

3. SUMMARY

The following presents a simplified summary of the present principles in order to provide a basic understanding of some aspects of the present principles. This summary is not an extensive overview of the present principles. It is not intended to identify key or critical elements of the present principles. The following summary merely presents some aspects of the present principles in a simplified form as a prelude to the more detailed description provided below.

The present principles propose a revertible chroma mapping that reduces the saturation inversion made by the chroma mapping at constant lightness. This is achieved by performing a new chroma mapping that respects the slopes of the source color gamut. Two embodiments are disclosed corresponding to modification of a brighter or darker part of the target gamut.

According to a first aspect a method for gamut mapping a color from a first color gamut (source gamut) towards a second color gamut (target gamut) is disclosed. The method comprises, in a plane of constant hue, obtaining a target color on the second color gamut boundary wherein the lightness of the target color is greater than or equal to the lightness of a color of maximum chroma of the first color gamut (source cusp color) and wherein the lightness of the target color is lower than the lightness of a color of maximum chroma of the second color gamut (target cusp color); and in case where the lightness of the color is greater than the lightness of the target color, mapping at constant lightness the chroma of a color on the first color gamut boundary by a decreasing function of chroma applied to lightness, wherein the respective outputs of the decreasing function applied to the lightness of the target color and to the lightness of the white are the chroma of the target color and the chroma of the white. This first specific embodiment is applicable in the case where the lightness of the target cusp color is higher than the lightness of the source cusp color.

According to a specific characteristic, the method further comprises determining for the color, the color on the first color gamut boundary at constant lightness; and in case where the lightness of the color is greater than the lightness of the target color, performing a chroma mapping at constant lightness of the color with respect to the determined color on the first color gamut boundary mapped with the decreasing function. This specific characteristic allows mapping any color in the hue leaf, and not only colors on the first color gamut boundary.

According to another specific characteristic, the method further comprises obtaining intermediary target colors and determining the decreasing function of chroma applied to lightness as responsive to target color, white, and intermediary target colors. This specific characteristic allows to further define the decreasing function.

According to another specific characteristic, the target color is on the second color gamut boundary and the lightness of the target color is a linear interpolation between the lightness of the source cusp color and the lightness target cusp color. This specific characteristic allows an adaptable trade-off between the range of saturation inversion and the repartition of mapped colors in the second gamut.

According to another specific characteristic, the target color is on the second color gamut boundary and the lightness of the target color is equal to the lightness of the source cusp color. This specific characteristic allows avoiding saturation inversion.

According to another specific characteristic, the source cusp color is selected from a group of primary colors and of secondary colors. This specific characteristic allows to reduce the number of target colors to provide. The skilled in the art will understand that for a hue leaf in between hue leaves of primary colors and of secondary colors, the target color is interpolated.

According to another specific characteristic, obtaining the target color comprises receiving metadata relative to parameters used for invertible gamut mapping.

According to a second specific embodiment in the case where the lightness of the target cusp color is lower than the lightness of the source cusp color, the method comprises obtaining a target color on the second color gamut boundary wherein the lightness of the target color is greater than the lightness of a color of maximum chroma of the second color gamut (target cusp color) and wherein the lightness of the target color is lower than or equal to the lightness of a color of maximum chroma of the first color gamut (source cusp color). In case where the lightness of the color is lower than the lightness of the target color, the chroma mapping comprises mapping, at constant lightness, the chroma of a color on the first color gamut boundary by an increasing function of chroma applied to lightness, wherein the respective outputs of the increasing function applied to the lightness of the target color and the lightness of the black are the chroma of the target color and the chroma of the black. Any of the specific characteristics described for the first embodiment are applicable to this second embodiment, mutatis mutandis.

According to a second aspect, a device for gamut mapping from a first color gamut towards a second color gamut is disclosed. The device comprises a processor configured, in a plane of constant hue, to obtain a target color on the second color gamut boundary wherein the lightness of the target color is greater than or equal to the lightness of a color of maximum chroma of the first color gamut (source cusp color) and wherein the lightness of the target color is lower than the lightness of a color of maximum chroma of the second color gamut (target cusp color); and in case where the lightness of the color is greater than the lightness of the target color, the processor is further configured to map at constant lightness the chroma of a color on the first color gamut boundary by a decreasing function of chroma applied to lightness, wherein the respective outputs of the decreasing function applied to the lightness of the target color and the lightness of the white are the chroma of the target color and the chroma of the white.

According to a third aspect, a signal having a SDR video and parameter values used for invertible color gamut mapping is disclosed. The signal is further formatted to comprise targetCroppingMode, crpWeightFactor for implementing the invertible color gamut mapping.

According to a fourth aspect, a non-transitory processor-readable medium whose contents store a SDR video and metadata relative to parameters used for invertible color gamut mapping, the non-transitory processor-readable medium further comprises comprise targetCroppingMode, crpWeightFactor for implementing the invertible color gamut mapping.

According to a fifth aspect, a computer program product comprising program code instructions to execute the steps of any of the disclosed methods when this program is executed on a computer is disclosed.

According to a sixth aspect, a processor readable medium is disclosed that has stored therein instructions for causing a processor to perform at least the steps of any the disclosed methods.

According to a seventh aspect, a non-transitory program storage device is disclosed that is readable by a computer, tangibly embodies a program of instructions executable by the computer to perform any of the disclosed methods.

While not explicitly described, the present embodiments may be employed in any combination or sub-combination. Besides, any characteristic or embodiment described for a method is compatible with a device intended to process the disclosed method and with a computer-readable storage medium storing program instructions.

4. BRIEF DESCRIPTION OF DRAWINGS

In the drawings, examples of the present principles are illustrated. It shows:

FIG. 1a illustrates a color gamut mapping in a hue leaf in accordance with prior art;

FIG. 1b illustrates a color gamut mapping in another hue leaf in accordance with prior art;

FIG. 1c illustrates a color gamut mapping in a hue leaf in accordance with prior art;

Figure 7:
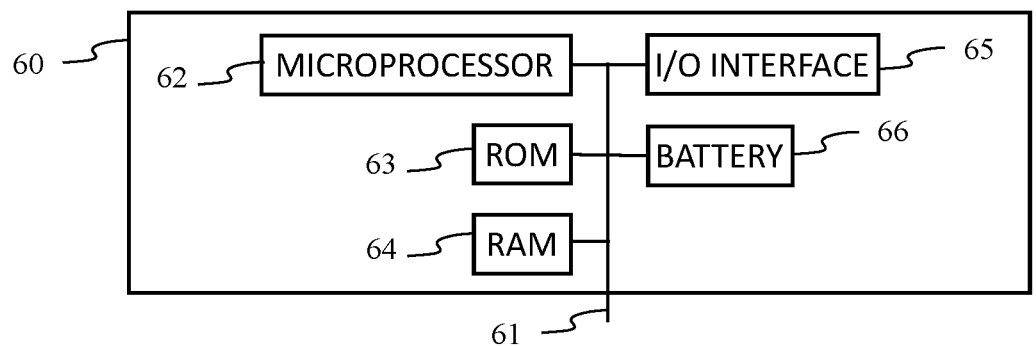
Figure 8:

FIG. 6a, FIG. 6b, FIG. 6c, and FIG. 6d illustrate the chroma mapping in a hue leaf in accordance with examples of the present principles;

FIG. 7 shows an example of an architecture of a device in accordance with an example of present principles; and FIG. 8 shows two remote devices communicating over a communication network in accordance with an example of present principles;

Similar or same elements are referenced with the same reference numbers.

5. DESCRIPTION OF EXAMPLE OF THE PRESENT PRINCIPLES

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as"/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present principles.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "in accordance with an example" or "in an example" means that a particular feature, structure, or characteristic described in connection with the example can be included in at least one implementation of the present principles. The appearances of the phrase "in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims.

While not explicitly described, the present examples and variants may be employed in any combination or sub-combination.

The present principles are described for decoding an image but extends to the decoding of a sequence of images (video) because each image of the sequence is sequentially encoded/decoded as described below.

Figure 2:
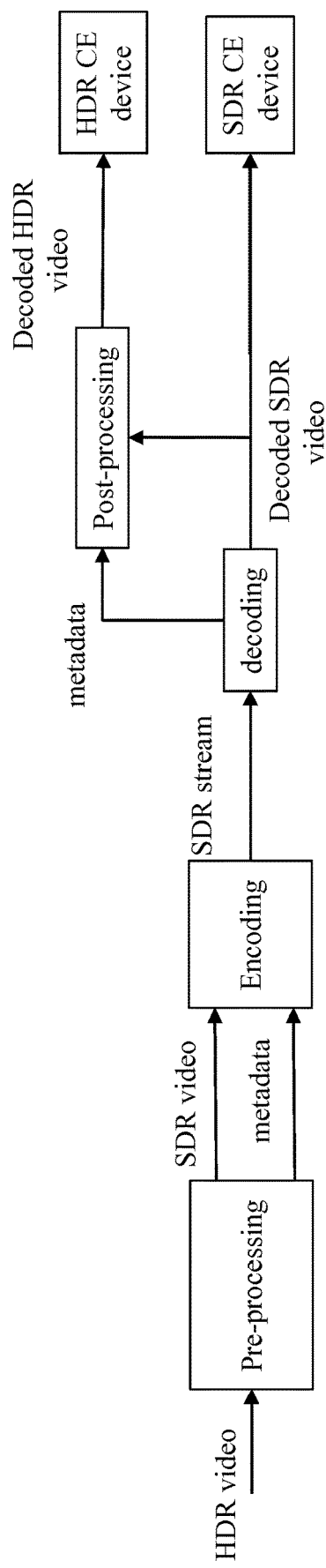
FIG. 2 shows an end-to-end workflow supporting content production and delivery to HDR and SDR displays.

FIG. 2 shows an end-to-end workflow supporting content production and delivery to HDR and SDR displays. It involves a single-layer SDR/HDR encoding-decoding with side metadata as defined, for example, in the ETSI recommendation ETSI TS 103 433. The reader may also refer to the IBC 2016 article ("A single-Layer HDR video coding framework with SDR compatibility", E. Francois and L. Van de Kerkhof, IBC 2016) for more details.

At a pre-processing stage, an incoming HDR video is decomposed in an SDR video and metadata. The SDR video is then encoded with any SDR video codec and an SDR bitstream is carried throughout an existing SDR distribution network with accompanying metadata conveyed on a specific channel or embedded in the SDR bitstream.

Preferably, the video coded is an HEVC codec such as the H.265/HEVC codec or H.264/AVC.

The metadata are typically carried by SEI messages when used in conjunction with an H.265/HEVC or H.264/AVC codec.

The SDR bitstream is decoded and a decoded SDR video is then available for an SDR Consumer Electronics (CE) display.

Next, at a post-processing stage, which is functionally the inverse of the pre-processing stage, the HDR video is reconstructed from the decoded SDR video and metadata obtained from a specific channel or from the SDR bitstream.

Figure 3A:
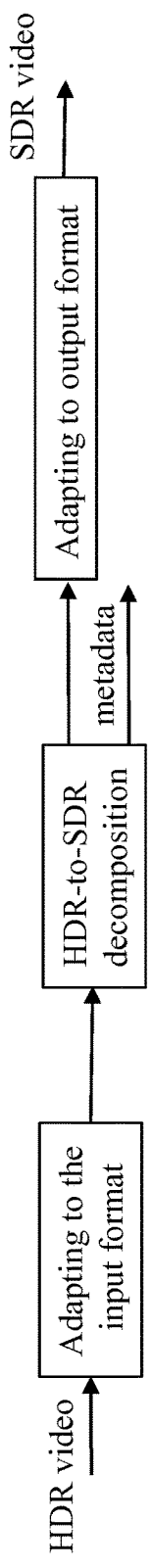
FIG. 3a depicts in more details the pre-processing stage.

FIG. 3a depicts in more details the pre-processing stage.

The core component of the pre-processing stage is the HDR-to-SDR decomposition that generates an SDR video and metadata from the HDR video.

More precisely, the HDR-to-SDR decomposition aims at converting a HDR video represented in a specific input format to a SDR video represented in a specific output format according to the embodiment disclosed below but the present principles are not limited to specific input/output format (color space or gamut).

Optionally, the format of the HDR video, respectively the format of the SDR video, may be adapted to said specific input format, respectively specific output format.

Said input/output format adapting may include color space conversion and/or color gamut mapping. Usual format adapting processes may be used such as RGB-to-YUV or YUV-to-RGB conversion, BT.709-to-BT.2020 or BT.2020-to-BT.709, down-sampling or up-sampling chroma components, etc.

The HDR-to-SDR decomposition aims at converting an input linear-light 4:4:4 RGB HDR video to an SDR compatible version. The process uses static metadata such as the color primaries and gamut of the container of the HDR and SDR images.

Optionally, the format of the HDR video may be previously adapted to the pre-determined input format of the pre-processing stage and/or a gamut mapping may be used when the HDR video (input of the HDR decomposition stage) and SDR video (output of the HDR decomposition stage) are represented in different color spaces.

Figure 3B:
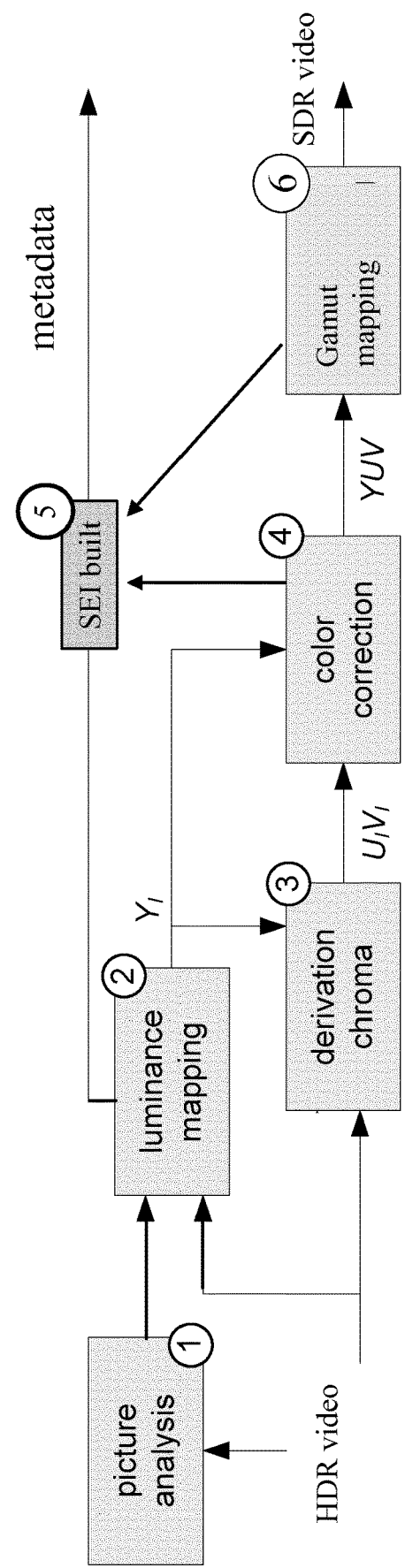
FIG. 3b depicts the HDR-to-SDR decomposition in more details.

FIG. 3b depicts the HDR-to-SDR decomposition in more details.

In the following, the HDR video samples are represented in the RGB color space (specific input format) and the SDR video samples are represented in the RGB color space (specific output format).

In step 1, the HDR video is analyzed image per image in order to derive a set of mapping parameters that will be further used to convert the HDR video into SDR video.

In step 2, the luminance component L of a current image of the HDR video to be decomposed, is luminance mapped to an SDR luma component $Y_l$. The resulting signal is the SDR luma (the SDR luma component $Y_l$) given by:

$$L = A_1 \begin{bmatrix} R \\ G \\ B \end{bmatrix} \qquad (1)$$

$$Y_l = TM[L] \qquad (2)$$

where $A=[A_1 A_2 A_3]^T$ is the canonical 3×3 R'G'B'-to-Y'CbCr conversion matrix (e.g. as specified in ITU-R Rec. BT.2020 or ITU-R Rec. BT.709 depending on the color space), $A_1 A_2 A_3$ being 1×3 matrices.

In step 3 in FIG. 3b, the chroma components are derived as follows. First the R, G, B values of the input HDR video are scaled by the ratio $(Y_l/L)$, which results in a linear-light SDR version of RGB. Then a square-root is applied, to reproduce a transfer function close to the ITU-R Rec. BT.709 OETF (Opto-Electrical Transfer Function). Note that the usage of a square root guarantees the reversibility of the process.

The resulting R, G, B signal is converted to chroma components $U_l$, $V_l$:

$$\begin{bmatrix} U_l \\ V_l \end{bmatrix} = \sqrt{\frac{Y_l}{L}} * \begin{bmatrix} A_2 \\ A_3 \end{bmatrix} * \begin{bmatrix} \sqrt{R} \\ \sqrt{G} \\ \sqrt{B} \end{bmatrix} \quad (3)$$

In step 4, a final color correction is applied in order to match the SDR colors to the HDR video colors. First the chroma components are adjusted by a scaling factor $1/\beta(Y_l)$, where $\beta(Y_l)$ is a function that enables control of the color saturation and hue of the resulting SDR video.

$$\begin{bmatrix} U_{SDR} \\ V_{SDR} \end{bmatrix} = \frac{1}{\beta(Y_l)} * \begin{bmatrix} U_l \\ V_l \end{bmatrix} \quad (4)$$

This step allows control of the SDR colors and to guarantee their matching to the HDR colors.

In step 6, an invertible gamut mapping process could apply when the input SDR picture of the SDR-to-HDR reconstruction process is provided in a BT.709 color gamut (as specified by the variable prePicColourSpace), and is different from the target BT.2020 color gamut of the HDR picture (as specified by the variable recPicColourSpace). Color backward compatibility is defined such that the SDR CE receiver only supports BT.709 color space while the video to be distributed using SL-HDR1 can support BT.2020 color space. When recPicColourSpace is not equal to prePic-ColourSpace, at the HDR-to-SDR decomposition side the WCG HDR video shall be converted to a standard color gamut SDR video (plus metadata) while the inverse process at the HDR reconstruction side reverts this conversion by rendering the WCG HDR video from the standard color gamut SDR video (plus metadata). The cascading of those two color processes should be visually lossless, while the standard color gamut SDR video should entirely preserve the artistic intent of the original WCG HDR video with minimal impairments. Both color reconstruction (inverse gamut mapping) and compression (gamut mapping) conversions are specified to be reciprocal.

In step 5, metadata relative to the luminance mapping (step 2), color correction (step 4) and invertible color gamut mapping (step 6) are conveyed to the post-processing stage. The metadata are conveyed as static metadata (in case parameters do not change with the picture) or dynamic metadata (in case parameters change with the picture as for luminance mapping).

These metadata enable fine control of the texture and colors of the SDR version, and to ensure a good fitting to the HDR intent.

Figure 4A:
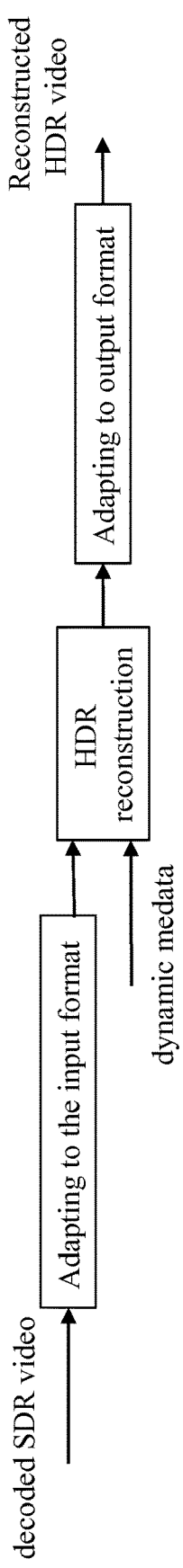
FIG. 4a depicts in more details the post-processing stage.

FIG. 4a depicts in more details the post-processing stage.

The core component of the post-processing stage is the SDR-to-HDR reconstruction that reconstructs an HDR video from a (decoded) SDR video and metadata.

More precisely, the HDR reconstruction aims at converting SDR video represented in a specific input format to an output HDR video represented in a specific output format according to the embodiment disclosed below but the present principles are not limited to specific input/output specific formats (color space or gamut).

Said input or output format adapting may include color space conversion and/or color gamut mapping. Usual format adapting processes may be used such as RGB-to-YUV or YUV-to-RGB conversion, BT.709-to-BT.2020 or BT.2020-to-BT.709 etc. For example, see Annex D of the ETSI recommendation ETSI TS 103 433 provides use cases of inverse gamut mapping.

Optionally, the format of the reconstructed HDR video may be adapted to a targeted system characteristics (e.g. a Set-Top-Box, a connected TV) and/or an inverse gamut mapping may be used when the decoded SDR video (input of the HDR reconstruction stage) and the reconstructed HDR video (output of the HDR reconstruction stage) are represented in different color spaces and/or gamut.

Figure 4B:
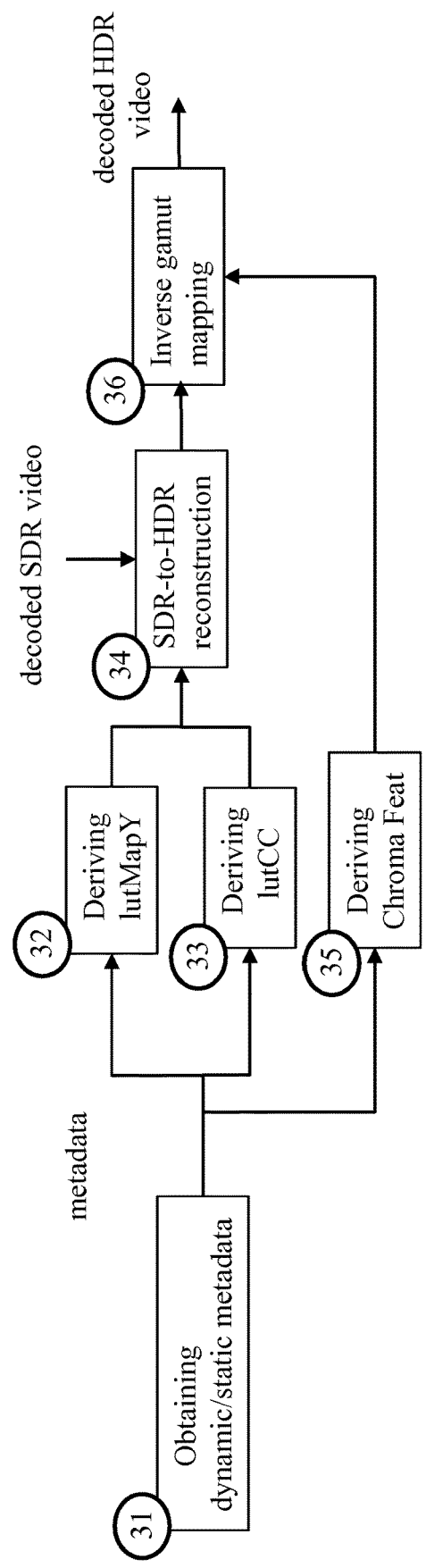
FIG. 4b depicts in more details the HDR reconstruction process.

FIG. 4b depicts in more details the HDR reconstruction process.

The HDR reconstruction is the functional inverse of the HDR-to-SDR decomposition (FIG. 3b). However, for implementation complexity reasons, some operations are concatenated or applied in a different order.

In step 31, dynamic and/or static metadata are obtained, for example from the SDR bitstream or from a specific channel.

In step 32, a luminance-mapping look-up-table lutMapY (a 1D look-up table) is derived from the obtained metadata. This luminance-mapping look-up-table corresponds to the inverse of the square-root of the luminance mapping curve.

In step 33, a color-correction look-up-table lutCC is derived from the obtained dynamic metadata. The color-correction look-up-table lutCC is linked to the pre-processing color correction $\beta_p(Y_l)$ (equation 4) and the luminance-mapping look-up table lutMapY by the following equation:

$$\beta[Y] = 2^B \times \text{lutMapY}[Y] \times \text{lutCC}[Y] \quad (5)$$

where B is the bit-depth of the luma component of the decoded SDR image.

In step 34, an image of the reconstructed HDR video (linear-light HDR video) is reconstructed by applying a HDR reconstruction to an image of the decoded SDR video using the derived luma-related look-up table lutMapY and the derived color correction look-up table lutCC. In step 36, the color reconstruction or inverse gamut mapping process enables the generation of a wide color gamut picture from a standard color gamut picture with associated metadata. This process is defined for a 4:4:4 chroma sampling and full range YUV linear-light signal. The input YUV signal comes from the conversion of an input RGB linear-light signal (output of the SDR-to-HDR reconstruction process 34) to a YUV color space thanks to the canonical R'G'B'-to-Y'CbCr matrix (computed thanks to SMPTE RP 177 [i.8]). This process further may comprise a chroma remapping according to the described embodiments, a lightness remapping (if any) and a hue remapping.

The post-processing operates on a luminance-mapping look-up table lutMapY (step 32), a color correction look-up table lutCC (step 33), and inverse gamut mapping parameters (step 35) defining chroma mapping that preserves saturation slopes. According to a salient idea, the disclosed chroma mapping operates at constant lightness and uses a cropped version of the target color gamut so that the lightness of the color with maximum chroma in the source gamut is almost the same than the lightness of the color with maximum chroma in the cropped version of the target color gamut. Besides a same slope for the boundary is determined for the source and target boundary. Accordingly parameters defining chroma mapping mode and the amount of gamut cropping required per primary and secondary colors are defined. The respective table and parameters are derived from metadata (step 31).

The metadata may be conveyed (step 5) as dynamic metadata according to either a so-called parameter-based mode or a table-based mode in order to derive the luminance-mapping look-up-table lutMapY (step 32), and the color-correction look-up-table lutCC (step 33) from obtained dynamic metadata (step 31). The metadata relative to inverse color gamut mapping may be conveyed (step 5) as static metadata. Some metadata to be conveyed in step 5 are chroma mapping parameters representative of the chroma mapping method, and of a target color required per primary and/or secondary colors (ETSI recommendation ETSI TS 103 433 clause 6.3.10). Accordingly the following parameters are described: targetCroppingMode and crpWeightFactor.

targetCroppingMode

This variable indicates the mode of the cropping of the standard gamut used by the invertible gamut mapping. The value of targetCroppingMode shall be as defined in the table below:

| Value of targetCroppingMode | Definition |
| --- | --- |
| 0 | Target gamut cropping disabled |
| 1 | Target gamut cropping applied to each primary and secondary colour |
| 2 | Target gamut cropping applied to the "cold" colours (the colours having their cusp value in the wide gamut lower than the cusp value in the standard gamut) |
| 3 | Target gamut cropping with weighting factor applied to each primary and secondary colour | crpWeightFactor

This array of six variables specifies the weight to be applied to each primary and secondary colour during the target gamut cropping process. This array shall be invoked only when targetCroppingMode is equal to 3. The index value c equal to 0 should correspond to the red primary, c equal to 1 should correspond to the magenta secondary, c equal to 2 should correspond to the blue primary, c equal to 3 should correspond to the cyan secondary, c equal to 4 should correspond to the green primary, c equal to 5 should correspond to the yellow secondary. The value of crpWeightFactor[c] is in the bounded range [0/128 . . . 135/128] by step of 9/128.

These parameters are respectively renamed croppingModeSCG and cmWeightFactor in more recent version of the ESTI recommendation.

These metadata may be conveyed using the HEVC Colour Volume Reconstruction Information (CVRI) user data registered SEI message whose syntax is based on the SMPTE ST 2094-20 specification (ETSI recommendation ETSI TS 103 433 Annex A.3).

In step 31, the CVRI SEI message is thus parsed to obtain the luminance mapping parameters, the color correction parameters and the inverse gamut parameters.

In step 32, the luminance-mapping look-up-table lutMapY is reconstructed (derived) from the obtained luminance mapping parameters (see ETSI TS 103 433 clause 7.2.3.1 for more details).

In step 33, the color-correction look-up-table lutCC is reconstructed (derived) from the obtained color correction parameters (see ETSI TS 103 433 clause 7.2.3.2 for more details).

In step 35, the features for the chroma mapping (namely the target color) are determined (derived) from the obtained inverse gamut mapping parameters as described hereafter with the color gamut mapping method. The chroma mapping parameters offer the possibility to either do a global chroma mapping for all colors, or to only map cold colors (such as blue, cyan and green corresponding to the colors for which the source cusp color is darker than the target cusp color) or to weight the chroma mapping at constant lightness of each individual primary and secondary color.

These metadata may be conveyed as dynamic metadata using the HEVC Colour Remapping Information (CRI) SEI message whose syntax is based on the SMPTE ST 2094-30 specification (ETSI recommendation ETSI TS 103 433 Annex A.4).

Note that static metadata may also be used by the post-processing stage and conveyed by SEI message. For example, the targetCroppingMode and crpWeightFactor may be carried by the TS 103 433 Information (TSI) user data registered SEI message (payloadMode) as defined by ETSI TS 103 433 (clause A.2.2). Static metadata such as, for example, the color primaries or the maximum display mastering display luminance are conveyed by a Mastering Display Colour Volume (MDCV) SEI message as defined in AVC, HEVC.

Figure 5:
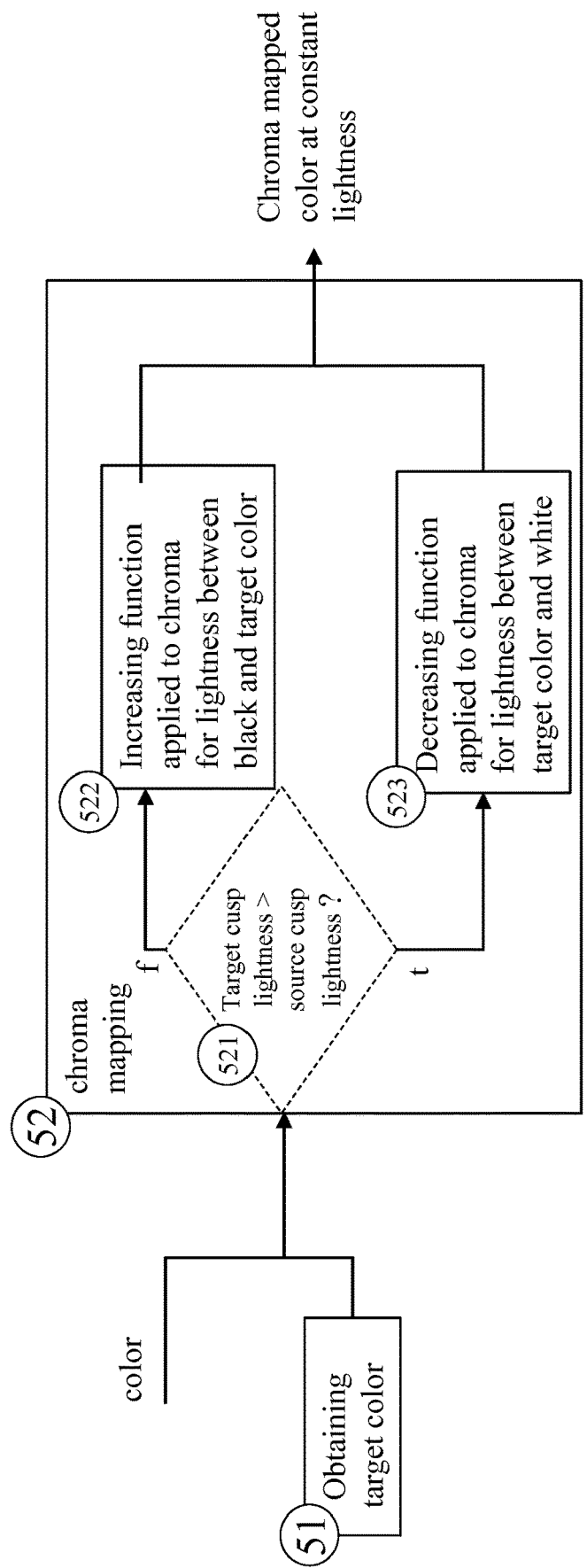
FIG. 5 shows a block diagram of the steps of a method for invertible color gamut mapping in accordance with examples of the present principles.
Figure 6B:
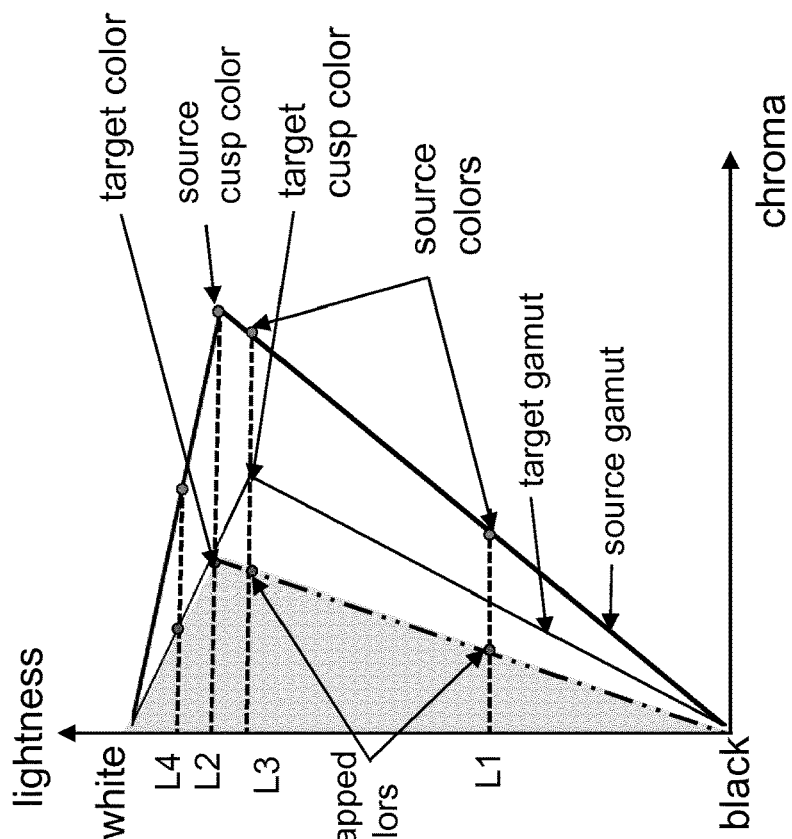
Figure 6A:
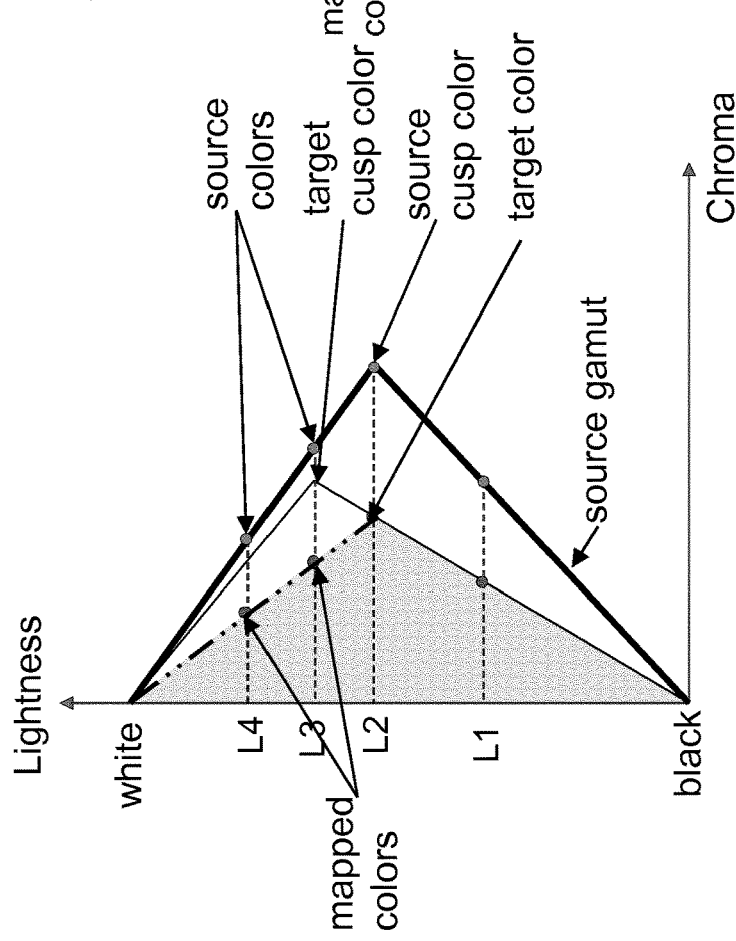
Figure 6D:
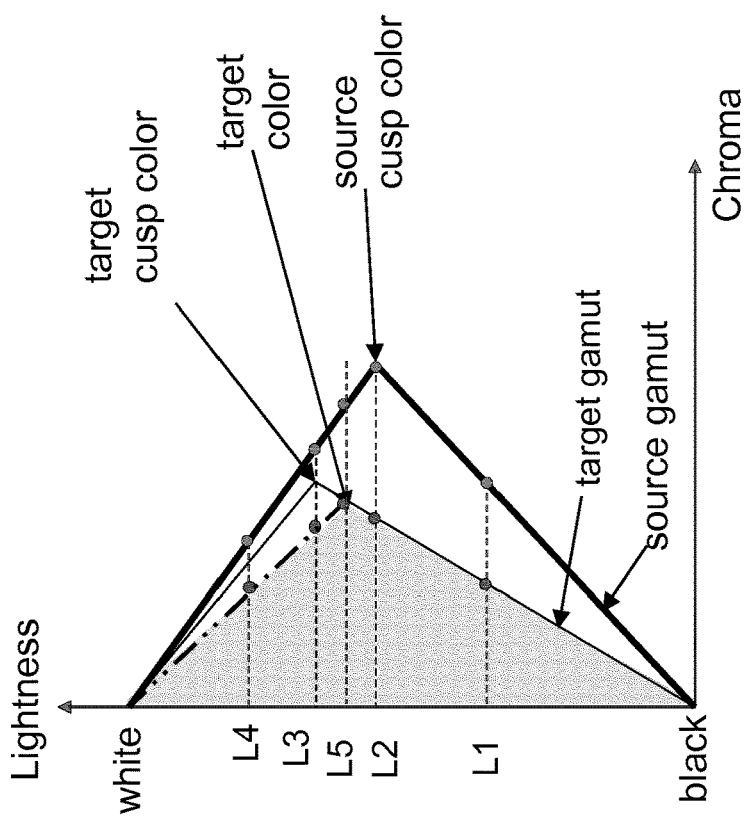
Figure 6C:
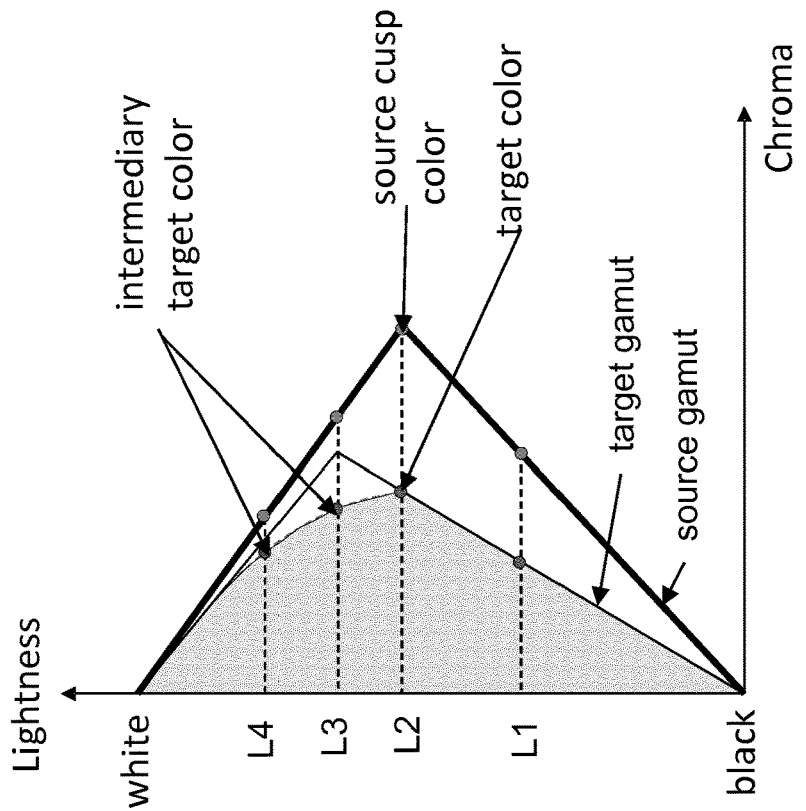

FIG. 5 shows a block diagram of the steps of a method for invertible gamut mapping in accordance with examples of the present principles. This method is compatible on any HDR-to-SDR decomposition process producing a SDR image and metadata. For illustrative purpose, the gamut mapping method is part (step 6) of the HDR-to-SDR decomposition process as described in relation with FIG. 3b. This process is particularly adapted when the wide color gamut HDR video shall be converted to a standard color gamut SDR video. Advantageously, chroma mapping at constant lightness according to present principles prevents or reduces saturation inversion in order to get a better preservation of the intent of the source colors of the HDR image. As shown on FIG. 6a, FIG. 6b, FIG. 6c and FIG. 6d, the output of the chroma mapping is cropped into the grey area of the target color gamut. However, since this method is fully invertible, the method is also compatible with any SDR-to-HDR reconstruction process producing a HDR image. For illustrative purpose, the gamut mapping method is also part (step 36) of the SDR-to-HDR reconstruction process as described in relation with FIG. 4b. This process is particularly adapted when the standard color gamut SDR video shall be converted back to a wide color gamut HDR video. Advantageously, the inverse gamut mapping reverts the chroma correction applied at the encoder side. The chroma is corrected while keeping the hue and lightness unchanged. However the method is also compatible with any process involving color gamut mapping from a first color gamut towards a second color gamut. The HDR video samples and the SDR video samples can be represented in any color space such as YUV, CIELUV, L*a*b* or IPT. For illustrative purpose, a HDR video sample, called color, is represented in a plane having a constant hue, known as hue leaf, as shown on FIG. 6a, FIG. 6b, FIG. 6c and FIG. 6d.

In a preliminary step 51, a target color is obtained for a color on the boundary of first gamut (source gamut). According to first variant illustrated on FIG. 6a, the lightness (L2) of the target color is equal to the lightness (L2) of a color of maximum chroma of the first color gamut (source cusp color) and the lightness (L2) of the target color is lower than the lightness (L3) of a color of maximum chroma of the second color gamut (target cusp color). According to second variant illustrated on FIG. 6b, the lightness (L2) of the target color is equal to the lightness (L2) of a color of maximum chroma of the first color gamut (source cusp color) and the lightness (L2) of the target color is greater than the lightness (L3) of a color of maximum chroma of the second color gamut (target cusp color). According to third variant illustrated on FIG. 6d, the lightness (L5) of the target color is greater than the lightness (L2) of a color of maximum chroma of the first color gamut (source cusp color) and the lightness (L5) of the target color is lower than the lightness (L3) of a color of maximum chroma of the second color gamut (target cusp color). Although not illustrated, in a fourth variant the lightness of the target color is greater than the lightness of a color of maximum chroma of the second color gamut (target cusp color) and the lightness of the target color is lower than the lightness of a color of maximum chroma of the first color gamut (source cusp color). Advantageously, as shown latter on, the first and second variants avoid any saturation inversion while the third and fourth variants limit the saturation inversion to colors whose lightness belongs to the interval between lightness (L2) of the color on the boundary of first gamut with maximum chroma, called source cusp color, and lightness of the target color (L5). On the contrary, in prior art methods, the saturation inversion occurs for colors whose lightness belongs to the interval between lightness (L2) of the source cusp color and lightness of the target cusp color (L3). The source cusp color (respectively the target cusp color) belongs to the boundary of first/source color gamut (respectively the second/target color gamut) and has a maximum chroma as shown on FIG. 6a and FIG. 6b. The target color is representative of the amount of chroma correction to apply to colors for which the lightness is greater than the lightness of the target color in the case where the lightness of the target cusp color is higher than the lightness of the source cusp color, or to colors for which the lightness is lower than the lightness of the target color in the case where the lightness of the target cusp color is lower than the lightness of the source cusp color. According to the first and second variants, the intersection between the second gamut boundary and the lightness line (L2) of source cusp color defines the target color. In the third variant, the target color is not determined for the lightness of source cusp color but is determined on the boundary of second gamut (target gamut) for a lightness (L5) responsive to the lightness (L3) of target cusp color and the lightness (L2) of source cusp color as shown on FIG. 6d. For instance, lightness (L5) of the target color is a linear combination of the lightness (L3) of target cusp color and of the lightness (L2) of source cusp color. This variant does not prevent the saturation inversion, but limits it to the range of colors which lightness is comprised between the lightness of the source cusp color and the lightness of the target color. Advantageously, this variant is a trade-off between saturation inversion and coverage of the second gamut (as mapped colors belong to a larger part of the second gamut). According to another non-limiting example, the lightness value of the target color ($L_5$) is obtained from a weighting factor, which is a ratio (or percentage) of the difference of lightness values between the lightness ($L_3$) of a second cusp color (source cusp color) and the lightness ($L_2$) of the second cusp color, for instance 0.3 or 30%, but is more generally in an interval [0-1] or [0%-100%]. According to a particular characteristic, the color is a key color selected from a group of primary colors and of secondary colors. As previously explained with regards to the variable targetCroppingMode, the chroma mapping is applied to each primary and secondary color, or to only to part of them such as green and blue primary colors and cyan secondary color, or with a weighting factor applied to each primary and secondary color. The weighting factors thus define the lightness ($L_5$) of the target color in the given hue leaf. According to a non-limiting example, a factor of 100% is applied to green and blue primary colors and cyan secondary color, and a factor of 50% is applied for yellow and magenta secondary colors and red primary. In this example as shown on FIG. 6a, the lightness ($L_2$) for the target color corresponds to the lightness of the source color on the boundary of first gamut with maximum chroma (source cusp color) in the same hue leaf. According to another non-limiting example, a factor of 50% is applied to green and blue primary colors and cyan secondary color, and a factor of 0% is applied for yellow and magenta secondary colors and red primary color. In this example as shown on FIG. 6d, the lightness ($L_5$) of the target color corresponds the arithmetic average (($L_2+L_3$)/2) of lightness of the source cusp color and of the target cusp color in the same hue leaf. In other word, the weighing factor defines a linear interpolation between lightness ($L_3$) of the target cusp color and the lightness ($L_2$) of the source cusp color. The parameters for obtaining the target color are advantageously sent/received for the key colors, thus limiting the size of metadata. According to the characteristic where the color is any color (meaning not a key color), the values of target color for the color are interpolated from the corresponding values for key colors. According to these examples, the lightness mapping is advantageously limited to some hues, e.g. for which the lightness of the cusp color is lower in the source color gamut than in the target color gamut as shown on FIG. 1a. In yet another fifth variant illustrated on FIG. 6c, N (N being an integer greater than 1) target colors are carefully determined as respective N chroma mapped values for N colors on the boundary of first gamut (source gamut) with the same lightness. Those N target colors allows to refine the increasing or decreasing function used in the chroma mapping. In a HDR-to-SDR decomposition process, key colors and corresponding target colors are defined and coded as parameters for invertible gamut mapping as exposed above. The chroma mapping parameters used for invertible gamut mapping are then sent metadata for inverse gamut mapping. In the SDR-to-HDR reconstruction process, metadata relative to parameters used for invertible gamut mapping are received, and key colors and corresponding target color are derived from the received parameters.

In a step 52, a chroma mapping of the color from the first color gamut towards the second color gamut at constant lightness is applied. Advantageously, the method is compatible with known methods that map the colors while keeping hue and lightness constant meaning that the output color is on the same constant-lightness line and in the same constant-hue leaf as the original color. The chroma mapping method according to the present principles is now explained for the first variant of FIG. 6a and third variant of FIG. 6d. The skilled in the art will easily adapt the description for other variants such as variant of FIG. 6b. In the first and third variants where the target cusp color is brighter than the source cusp color (the target color being in between), a decreasing function, representative of a cropped target gamut (dash line on FIG. 1a), is defined such that the chroma values output of the function applied to increasing value of lightness are decreasing chroma values and such that the cropped target gamut boundary passes through the target color and of the white. In other words, the output of the function applied to the lightness of the target color results in the chroma of the target color and the output of the function applied to the lightness of the white results in the chroma of the white (being zero). Thus mapping (523) at constant lightness the chroma of a color on the first color gamut boundary comprises applying the decreasing function to lightness of the color in case where the lightness of the color is greater than the lightness of the target color (and up to the lightness of the white). For other colors on the first color gamut boundary, i.e. in case where the lightness of the color is lower than the lightness of the target color (and down to the lightness of the back), known chroma mapping is applied. Thus, the cropped target gamut boundary follows the decreasing of the source gamut boundary for brighter values. In the further variant where the lightness of the target color corresponds to the lightness of the source cusp color, the disclosed method prevents from saturation inversion while avoiding any preliminary lightness mapping. The skilled in the art will appreciate that for colors not on first gamut boundary, the mapping comprises determining for the color, the color on the first color gamut boundary at constant lightness; and in case the lightness of the color is greater than the lightness ($L5$) of the target color, performing a chroma mapping at constant lightness of the color with respect to the determined color on the first color gamut boundary mapped with the decreasing function. More generally, for any color, chroma mapping at constant lightness of the color is performed with respect to mapped chroma of the determined color on the first color gamut boundary. According to a particular embodiment, a linear chroma scaling is used that maps the colors on each constant lightness line ($L_1, L_2, L_3, L_4$) such that the source color with the highest chroma value on this line ($L_2$) is mapped on this same constant lightness line ($L_2$) to the determined color on the first color gamut boundary mapped with the decreasing function in case the lightness of the color is greater than the lightness ($L_5$) of the target color, or to the color of the target gamut boundary on this same constant lightness line ($L_2$) in case the lightness of the color is lower than the lightness ($L_5$). In case of the blue primary color, as shown on FIG. 6a, since the lower part of the target gamut is linear, an increasing function applied to the chroma is an affine function corresponding to the target gamut. Besides, a color on the first color gamut boundary between the source cusp color and white is mapped with a decreasing function of chroma between target color and white at constant lightness. In case of the blue primary color, as shown on FIG. 6a, since the target gamut is piece-wise linear, the decreasing function applied to the chroma is also an affine function joining target color and white. Advantageously, in a linear color space, in each constant-hue leaf, mapped colors are only distributed into a triangle defined by the black, the white and the target color corresponding to the source cusp color. In other words, the mapped color gamut is cropped so that on its boundary the saturation does not increase with the lightness for lightness values bigger than the lightness of the source cusp color. The shape of the mapped gamut is thus closer to the shape of the source color gamut (since on the boundary of the source color gamut the saturation does not increase with the lightness for lightness values bigger than the lightness of the cusp color). For sake of simplicity in the example, affine functions are described but the present principles are compatible with any other function. In another example, the function used in each constant-hue leaf is a quadratic function. According to a variant as shown on FIG. 6c a part of the upper segment of the target color gamut or the whole segment (the line joining the white with the cusp target color) is replaced by a parabola tangent to this segment and joining the N target intermediary colors.

For the sake of completeness, the whole chroma mapping is briefly exposed. In a preliminary test 521, the variant where the darker or brighter part of the gamut boundary is cropped is determined. Accordingly, if the lightness of the target cusp color is greater than the lightness of the source cusp color, the brighter part of target gamut is cropped with the decreasing function 523 corresponding to variants of FIG. 6a, FIG. 6c and FIG. 6d. If the lightness of the target cusp color is lower than the lightness of the source cusp color, the darker part of target gamut is cropped with the increasing 522 function corresponding to variant of FIG. 6b.

Even if the disclosed method allows not using a preliminary lightness mapping, the method is although compatible with lightness mapping to achieve a satisfying trade-off distribution of the colors in the target gamut and contrast alteration. Accordingly, a lightness mapping may be used to map the source cusp color to an intermediary target color with a lightness closer to the target cusp color. This corresponds to applying the proposed method after lightness mapping, using the lightness mapped color gamut instead of the source color gamut.

Those skilled in the art will understand, that the method is fully invertible since for inverse gamut mapping, source and target gamut boundary are inversed. Indeed the inverse chroma mapped color is obtained by using the same increasing or decreasing function as used during the forward gamut mapping.

This method is based on any HDR reconstruction process requiring a SDR image and dynamic metadata.

For illustrative purpose, the HDR reconstruction process may be the HDR reconstruction process as described in relation with FIG. 4b. In that case, the HDR image is reconstructed from a decoded SDR image. But, the SDR image, used for reconstructing an HDR image may also be stored with compression and obtained without requiring a decoding.

Then, the method obtains, for example by decoding a SDR bitstream, a (decoded) SDR image whose dynamic range of the luminance values is lower than the dynamic range of the luminance values of the HDR image to be reconstructed.

On FIG. 2-5, the modules are functional units, which may or not be in relation with distinguishable physical units. For example, these modules or some of them may be brought together in a unique component or circuit, or contribute to functionalities of a software. A contrario, some modules may potentially be composed of separate physical entities. The apparatus which are compatible with the present principles are implemented using either pure hardware, for example using dedicated hardware such ASIC or FPGA or VLSI, respectively <<Application Specific Integrated Circuit>>, <<Field-Programmable Gate Array>>, <<Very Large Scale Integration>>, or from several integrated electronic components embedded in a device or from a blend of hardware and software components.

FIG. 7 represents an exemplary architecture of a device 60 which may be configured to implement a method described in relation with FIG. 2-5.

Device 60 comprises following elements that are linked together by a data and address bus 61:
  a microprocessor 62 (or CPU), which is, for example, a DSP (or Digital Signal Processor);
  a ROM (or Read Only Memory) 63;
  a RAM (or Random Access Memory) 64;
  an I/O interface 65 for reception of data to transmit, from an application; and
  a battery 66

In accordance with an example, the battery 66 is external to the device. In each of mentioned memory, the word <<register>> used in the specification can correspond to area of small capacity (some bits) or to very large area (e.g. a whole program or large amount of received or decoded data). The ROM 63 comprises at least a program and parameters. The ROM 63 may store algorithms and instructions to perform techniques in accordance with described embodiments. When switched on, the CPU 62 uploads the program in the RAM and executes the corresponding instructions.

RAM 64 comprises, in a register, the program executed by the CPU 62 and uploaded after switch on of the device 60, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with an example of encoding or an encoder, the HDR video or an HDR image of a HDR video is obtained from a source. For example, the source belongs to a set comprising:
- a local memory (63 or 64), e.g. a video memory or a RAM (or Random Access Memory), a flash memory, a ROM (or Read Only Memory), a hard disk;
- a storage interface (65), e.g. an interface with a mass storage, a RAM, a flash memory, a ROM, an optical disc or a magnetic support;
- a communication interface (65), e.g. a wireline interface (for example a bus interface, a wide area network interface, a local area network interface) or a wireless interface (such as a IEEE 802.11 interface or a Bluetooth® interface); and
- an image capturing circuit (e.g. a sensor such as, for example, a CCD (or Charge-Coupled Device) or CMOS (or Complementary Metal-Oxide-Semiconductor)).

In accordance with an example of the decoding or a decoder, the decoded SRD video or reconstructed HDR video is sent to a destination; specifically, the destination belongs to a set comprising:
- a local memory (63 or 64), e.g. a video memory or a RAM, a flash memory, a hard disk;
- a storage interface (65), e.g. an interface with a mass storage, a RAM, a flash memory, a ROM, an optical disc or a magnetic support;
- a communication interface (65), e.g. a wireline interface (for example a bus interface (e.g. USB (or Universal Serial Bus)), a wide area network interface, a local area network interface, a HDMI (High Definition Multimedia Interface) interface) or a wireless interface (such as a IEEE 802.11 interface, WiFi® or a Bluetooth® interface); and
- a display.

In accordance with examples of encoding or encoder, the SDR bitstream and/or the other bitstream carrying the metadata are sent to a destination. As an example, one of these bitstream or both are stored in a local or remote memory, e.g. a video memory (64) or a RAM (64), a hard disk (63). In a variant, one or both of these bitstreams are sent to a storage interface (65), e.g. an interface with a mass storage, a flash memory, ROM, an optical disc or a magnetic support and/or transmitted over a communication interface (65), e.g. an interface to a point to point link, a communication bus, a point to multipoint link or a broadcast network.

In accordance with examples of decoding or decoder, the SDR bitstream and/or the other bitstream carrying the metadata is obtained from a source. Exemplarily, the bitstream is read from a local memory, e.g. a video memory (64), a RAM (64), a ROM (63), a flash memory (63) or a hard disk (63). In a variant, the bitstream is received from a storage interface (65), e.g. an interface with a mass storage, a RAM, a ROM, a flash memory, an optical disc or a magnetic support and/or received from a communication interface (65), e.g. an interface to a point to point link, a bus, a point to multipoint link or a broadcast network.

In accordance with examples, device 60 being configured to implement an encoding method as described above, belongs to a set comprising:
- a mobile device;
- a communication device;
- a game device;
- a tablet (or tablet computer);
- a laptop;
- a still image camera;
- a video camera;
- an encoding chip;
- a still image server; and
- a video server (e.g. a broadcast server, a video-on-demand server or a web server).

In accordance with examples, device 60 being configured to implement a decoding method as described above, belongs to a set comprising:
- a mobile device;
- a communication device;
- a game device;
- a set top box;
- a TV set;
- a tablet (or tablet computer);
- a laptop;
- a display and
- a decoding chip.

According to an example of the present principles, illustrated in FIG. 8, in a transmission context between two remote devices A and B over a communication network NET, the device A comprises a processor in relation with memory RAM and ROM which are configured to implement a method for encoding an image as described above and the device B comprises a processor in relation with memory RAM and ROM which are configured to implement a method for decoding as described above.

In accordance with an example, the network is a broadcast network, adapted to broadcast still images or video images from device A to decoding devices including the device B.

A signal, intended to be transmitted by the device A, carries the SDR bitstream and/or the other bitstream carrying the metadata. The SDR bitstream comprises an encoded SDR video as explained before. This signal further comprises metadata relative to parameter values used for reconstructing an HDR video from said decoded SDR video.

Implementations of the various processes and features described herein may be embodied in a variety of different equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and any other device for processing an image or a video or other communication devices. As should be clear, the equipment may be mobile and even installed in a mobile vehicle.

Additionally, the methods may be implemented by instructions being performed by a processor, and such instructions (and/or data values produced by an implementation) may be stored on a computer readable storage medium. A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described example of the present principles, or to carry as data the actual syntax-values written by a described example of the present principles. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising:
gamut mapping a current color from a first color gamut towards a second color gamut, the gamut mapping comprising, in a plane of constant hue, mapping chroma of the current color from the first color gamut towards the second color gamut at a constant lightness value, wherein mapping the chroma further comprises:
obtaining a target color on a second color gamut boundary, wherein lightness of the target color is greater than or equal to lightness of a color of maximum chroma of the first color gamut and wherein the lightness of the target color is lower than lightness of a color of maximum chroma of the second color gamut;
in response to determining that lightness of the current color is greater than the lightness of the target color, mapping, at a constant lightness value, chroma of a color on a first color gamut boundary by a decreasing function of chroma applied to lightness, wherein endpoints of the decreasing function of chroma applied to the lightness of the target color and to lightness of white are, respectively, chroma of the target color and chroma of the white.

2. The method of claim 1, further comprising, in the plane of constant hue:
determining for the current color, a color on the first color gamut boundary at a constant lightness value; and
in response to determining that, the lightness of the current color is greater than the lightness of the target color, performing a chroma mapping at a constant lightness value of the current color with respect to the color on the first color gamut boundary mapped with the decreasing function.

3. The method of claim 1, further comprising obtaining intermediary target colors and determining a decreasing function of chroma applied to lightness as responsive to the target color, the white, and the intermediary target colors.

4. The method of claim 1, wherein the lightness of the target color is a linear interpolation between the lightness of the color of maximum chroma of the first color gamut and the lightness of the color of maximum chroma of the second color gamut.

5. The method of claim 1, wherein the lightness of the target color is equal to the lightness of the color of maximum chroma of the first color gamut.

6. The method of claim 1, wherein the color of maximum chroma of the first color gamut is selected from a group of primary colors and secondary colors.

7. The method of claim 1, wherein the decreasing function is a piecewise affine function.

8. The method of claim 1, wherein the gamut mapping utilizes metadata relative to parameters used for invertible gamut mapping.

9. A method comprising:
gamut mapping a current color from a first color gamut towards a second color gamut, the gamut mapping comprising, in a plane of constant hue, mapping chroma of the current color from the first color gamut towards the second color gamut at a constant lightness value, wherein mapping the chroma mapping further comprises:
obtaining a target color on a second color gamut boundary, wherein lightness of the target color is greater than lightness of a color of maximum chroma of the second color gamut and wherein the lightness of the target color is lower than or equal to lightness of a color of maximum chroma of the first color gamut;
in response to determining that lightness of the current color is lower than the lightness of the target color, mapping at a constant lightness value chroma of a color on a first color gamut boundary by an increasing function of chroma applied to lightness, wherein endpoints of the increasing function of chroma applied to the lightness of the target color and to lightness of black are, respectively, chroma of the target color and chroma of the black.

10. The method of claim 9, wherein the lightness of the target color is a linear interpolation between the lightness of the color of maximum chroma of the first color gamut and the lightness of the color of maximum chroma of the second color gamut.

11. The method of claim 9, wherein the lightness of the target color is equal to the lightness of the color of maximum chroma of the first color gamut.

12. The method of claim 9, wherein the color of maximum chroma of the first color gamut is selected from a group of primary colors and secondary colors.

13. The method of claim 9, wherein the increasing function is a piecewise affine function.

14. The method of claim 9, wherein the gamut mapping utilizes metadata relative to parameters used for invertible gamut mapping.

15. A device comprising one or more processors and at least one memory having stored instructions operative, when executed by the one or more processors, to cause the apparatus to:
gamut map a current color from a first color gamut towards a second color gamut in a plane of constant hue;
obtain a target color on a second color gamut boundary, wherein lightness of the target color is greater than or equal to lightness of a color of maximum chroma of the first color gamut and wherein the lightness of the target color is lower than lightness of a color of maximum chroma of the second color gamut; and perform chroma mapping of the current color from the first color gamut towards the second color gamut at a constant lightness value, wherein, in response to determining that lightness of the current color is greater than the lightness of the target color, chroma of a color on the first color gamut boundary is mapped at a constant lightness value by a decreasing function of chroma applied to lightness, and wherein endpoints of the decreasing function of chroma applied to the lightness of the target color and to lightness of white are, respectively, chroma of the target color and chroma of the white.

16. The device of claim 15, wherein the lightness of the target color is a linear interpolation between the lightness of the color of maximum chroma of the first color gamut and the lightness of the color of maximum chroma of the second color gamut.

17. The device of claim 15, wherein the lightness of the target color is equal to the lightness of the color of maximum chroma of the first color gamut.

18. The device of claim 15, wherein the color of maximum chroma of the first color gamut is selected from a group of primary colors and secondary colors.

19. The device of claim 15, wherein the decreasing function is a piecewise affine function.

20. A non-transitory processor-readable storage medium having stored therein instructions that, when executed by a processor, cause the processor to gamut map a current color from a first color gamut towards a second color gamut, the gamut mapping comprising, in a plane of constant hue, mapping chroma of the current color from the first color gamut towards the second color gamut at a constant lightness value, wherein mapping the chroma further comprises:
obtaining a target color on a second color gamut boundary, wherein lightness of the target color is greater than or equal to lightness of a color of maximum chroma of the first color gamut and wherein the lightness of the target color is lower than lightness of a color of maximum chroma of the second color gamut;
in response to determining that lightness of the current color is greater than the lightness of the target color, mapping, at a constant lightness value, chroma of a color on a first color gamut boundary by a decreasing function of chroma applied to lightness, wherein endpoints of the decreasing function of chroma applied to the lightness of the target color and to lightness of white are, respectively, chroma of the target color and chroma of the white.

* * * * *

UNITED STATES PATENT AND TRADEMARK OFFICE
CERTIFICATE OF CORRECTION

PATENT NO. : 11,095,864 B2
APPLICATION NO. : 16/610503
DATED : August 17, 2021
INVENTOR(S) : Cedric Thebault, Jurgen Stauder and Angelo Mazzante Page 1 of 1

It is certified that error appears in the above-identified patent and that said Letters Patent is hereby corrected as shown below:

In the Claims

At Column 20, Line 47, Claim 2, replace "that," with --that--

At Column 21, Line 12, Claim 9, replace "chroma mapping" with --chroma--

Signed and Sealed this
Twenty-sixth Day of December, 2023

Katherine Kelly Vidal
*Director of the United States Patent and Trademark Office*